United States Patent
Frazier et al.

(10) Patent No.: US 10,614,492 B2
(45) Date of Patent: *Apr. 7, 2020

(54) WIRELESS COMMUNICATION DEVICE ACCOUNT PAYMENT NOTIFICATION SYSTEMS AND METHODS

(75) Inventors: Patricia A. Frazier, Dallas, TX (US); Kenneth Algiene, Highlands Ranch, CO (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 466 days.

This patent is subject to a terminal disclaimer.

(21) Appl. No.: 12/859,092

(22) Filed: Aug. 18, 2010

(65) Prior Publication Data

US 2010/0332383 A1 Dec. 30, 2010

Related U.S. Application Data

(63) Continuation of application No. 12/364,133, filed on Feb. 2, 2009, now Pat. No. 7,840,466, which is a (Continued)

(51) Int. Cl.
*G06Q 30/04* (2012.01)
*G06Q 20/04* (2012.01)
(Continued)

(52) U.S. Cl.
CPC ............ *G06Q 30/04* (2013.01); *G06Q 20/04* (2013.01); *G06Q 20/102* (2013.01); *G06Q 20/32* (2013.01);
(Continued)

(58) Field of Classification Search
CPC ...... G06Q 40/00; G06Q 50/00; G06Q 20/322; G06Q 20/32; G06Q 20/3224; G06Q 30/04;
(Continued)

(56) References Cited

U.S. PATENT DOCUMENTS

| 5,615,110 A | 3/1997 | Wong |
| 5,734,709 A | 3/1998 | DeWitt et al. |

(Continued)

FOREIGN PATENT DOCUMENTS

| EP | 0 999 690 | * | 2/1999 | ............ H04M 15/00 |
| WO | WO 2002/13120 | * | 4/2001 | |
| WO | WO-0207110 A2 | * | 1/2002 | ............ G06Q 20/04 |

OTHER PUBLICATIONS

Walsh, Ellen: KUBRA E-Bill Electronic Bill Payment and Presentment, Sep. 3, 2002, Product Report, pp. 1-11 (Year: 2002).*

(Continued)

*Primary Examiner* — Bijendra K Shrestha
(74) *Attorney, Agent, or Firm* — Kilpatrick Townsend & Stockton LLP

(57) ABSTRACT

Systems and methods are provided for notifying a wireless communication device user regarding an account payment. One method comprises dialing a phone number of a wireless communication device, preferably a cell phone. A communication relating to an account payment that includes a balance due is then transmitted or delivered to a wireless communication device user. Optionally, at the same time or a later time, input from the wireless communication device user may be received regarding payment of the balance due. Such notification methods may be carried out by a host computer system which has a record of when the account payment is due and dials and transmits within a predetermined time frame. Generally, such methods will further comprise pre-registering or enrolling the wireless communication device user.

24 Claims, 5 Drawing Sheets

Related U.S. Application Data continuation of application No. 10/273,436, filed on Oct. 16, 2002, now abandoned.

(51) Int. Cl.
*G06Q 20/32* (2012.01)
*G06Q 40/00* (2012.01)
*G06Q 20/10* (2012.01)

(52) U.S. Cl.
CPC ......... *G06Q 20/3221* (2013.01); *G06Q 40/00* (2013.01)

(58) Field of Classification Search
CPC ... G06Q 20/102; G06Q 20/3221; G06Q 20/04
USPC .............................. 705/1–129; 235/379–380
See application file for complete search history.

(56) References Cited

U.S. PATENT DOCUMENTS

| | | | |
|---|---|---|---|
| 5,893,902 A * | 4/1999 | Transue | G06Q 20/04 704/270 |
| 5,915,226 A | 6/1999 | Martineau | |
| 5,920,847 A * | 7/1999 | Kolling | G06Q 20/02 705/40 |
| 6,012,035 A | 1/2000 | Freeman et al. | |
| 6,032,133 A * | 2/2000 | Hilt et al. | 705/40 |
| 6,118,778 A | 9/2000 | Amin | |
| 6,233,656 B1 | 5/2001 | Lewis et al. | |
| 6,332,133 B1 * | 12/2001 | Takayama | G06Q 20/04 235/380 |
| 6,360,211 B1 * | 3/2002 | Anderson | G06Q 20/102 705/30 |
| 6,360,254 B1 * | 3/2002 | Linden et al. | 709/219 |
| 6,480,410 B2 | 11/2002 | Kang et al. | |
| 6,480,710 B1 | 11/2002 | Layboume et al. | |
| 6,526,273 B1 | 2/2003 | Link, II et al. | |
| 6,609,113 B1 * | 8/2003 | O'Leary et al. | 705/39 |
| 7,158,955 B2 * | 1/2007 | Diveley et al. | 705/74 |
| 7,370,014 B1 * | 5/2008 | Vasavada et al. | 705/40 |
| 7,647,275 B2 * | 1/2010 | Jones | 705/40 |
| 7,805,352 B2 * | 9/2010 | Mercier | G06Q 40/00 705/35 |
| 7,840,466 B2 | 11/2010 | Frazier et al. | |
| 7,949,600 B1 * | 5/2011 | Portillo | G06Q 20/02 705/39 |
| 8,725,605 B1 * | 5/2014 | Plunkett | G06Q 40/02 705/35 |
| 2001/0029492 A1 * | 10/2001 | Uchikata | 705/64 |
| 2001/0032193 A1 | 10/2001 | Ferber | |
| 2002/0013711 A1 * | 1/2002 | Ahuja | G06Q 40/02 709/206 |
| 2002/0023055 A1 | 2/2002 | Antognini et al. | |
| 2002/0035539 A1 * | 3/2002 | O'Connell | G06Q 20/02 705/39 |
| 2002/0052841 A1 * | 5/2002 | Guthrie | G06Q 20/04 705/40 |
| 2002/0065774 A1 | 5/2002 | Young et al. | |
| 2002/0123965 A1 * | 9/2002 | Phillips | 705/41 |
| 2002/0147682 A1 * | 10/2002 | Price et al. | 705/40 |
| 2002/0147685 A1 * | 10/2002 | Kwan | G06Q 20/04 705/44 |
| 2002/0161733 A1 * | 10/2002 | Grainger | 706/45 |
| 2003/0004874 A1 * | 1/2003 | Ludwig et al. | 705/40 |
| 2003/0014361 A1 * | 1/2003 | Klatt | G06Q 20/10 705/40 |
| 2003/0089768 A1 * | 5/2003 | Page | G06Q 20/04 235/379 |
| 2003/0119478 A1 * | 6/2003 | Nagy et al. | 455/408 |
| 2003/0229588 A1 * | 12/2003 | Falk | G06Q 30/04 705/40 |
| 2003/0229595 A1 * | 12/2003 | Mononen | G06Q 20/42 705/63 |
| 2004/0078327 A1 | 4/2004 | Frazier et al. | |
| 2005/0010523 A1 * | 1/2005 | Myklebust | G06Q 30/04 705/40 |
| 2005/0144020 A1 * | 6/2005 | Muzaffar | G06Q 20/04 705/38 |
| 2009/0164357 A1 | 6/2009 | Frazier et al. | |

OTHER PUBLICATIONS

Oracle: Using Database Trigger, 1997, Oracle8 Application Developer's Guide, Release 8.0, A58241-01, pp. 1-30 (Year: 1997).*

Gillespie, Neil: Big Names Back Multi-Channel B2B Financial Service Provider, Dec. 6, 2001, New Media Age, pp. 1-3. (Year: 2001).*

"First Data Launches New e-Business Authentication Solution", Press Release Article (online), 2003, retrieved on Jan. 23, 2003 at: http://news.firstdata.com/media/ReleaseDetail.cfm?ReleaseID=95408.

"First Data Presents Retail Merchants With Combined Processing Solutions Including Credit, Signature and Pin-Based Debit, Propritary Gift Cards, Electronic Check and Check Services", Press Release Article (online), 2003, retrieved Jan. 23, 2003 at: http://news.firstdata.com/media/ReleaseDetail.cfm?ReleaseID=99275.

"eOne Global Acquires BillingZone LLC from PNC Bank and Perot Systems", Press Release Article (online), 2003, retrieved on Jan. 23, 2003 at: http://news.firstdata.com/media/ReleaseDetai.cfm?ReleaseIS=98253.

U.S. Appl. No. 10/112,258, filed Mar. 29, 2002 entitled "Electronic Identifier Payment Systems and Methods".

U.S. Appl. No. 10/112,440, filed Mar. 29, 2002 entitled "Systems and Methods for Enrolling Customers in Goods and Services".

* cited by examiner

WIRELESS COMMUNICATION DEVICE ACCOUNT PAYMENT NOTIFICATION SYSTEMS AND METHODS

BACKGROUND OF THE INVENTION

The present invention generally relates to account payment systems and methods. More particularly, the present invention relates to systems and methods that allow a provider, such as an independent third party bill payment service provider or a billing party, to deliver account payment information to a wireless communication device user, preferably to a cell phone user.

Millions of households need to spend a significant amount of time and energy each month to respond to numerous account or bill payments. Such account payments may include utility bills (e.g., cell phone, telephone, water, electricity, gas, garbage, cable), credit card bills, loan payment bills (e.g., home mortgage payments, car loan payments, student loan payments, commercial business loan payments), insurance payments, tax bill payments (e.g., property tax, personal income tax, business tax), merchant bills, bank bills, etc.

The most common method of account payment is mail delivery of a paper bill or coupon book by a billing party to a bill payer. The bill payer in return writes a paper check for the appropriate amount and mails the check along with the associated account payment coupon to the billing party. This method is labor intensive and time consuming for the bill payer. Moreover, account payments must be done on multiple occasions each month since bills do not normally arrive or become due on the same date. In addition, the bill-payer has to absorb the cost of postage in mailing the paper checks to the billing parties. In short, the bill payer is required to inconveniently go through multiple steps for account payment, including manually receiving each bill, keeping track of account payments for a variety of bills depending on when they arrive or become due, and manually paying each bill as well as absorbing postage costs. Further, mail delivery of a bill may be problematic in certain circumstances. For example, the bill payer may misplace, lose, or never receive a mailed account payment notification or be away from home on a business trip or vacation, without receiving a bill in the mail, resulting in the bill being unpaid and possibly becoming overdue. Overdue bills may in turn result in finance charges being assessed to the bill payer and/or cause other inconveniences, such as, the trouble of getting canceled or terminated services reinstated.

With respect to the billing party, the cost for preparing and mailing a paper bill may be a significant per unit cost. These costs include the paper for the bill, any enclosures, the envelope, postage, printing, data management, etc. Paper check processing also entails significant costs to the billing parties who receive and handle remittances in this manner. Billing parties have a large incentive to try to reduce this high cost associated with mailing account payment statements. Furthermore, receipt of a paper bill in the mail does not necessarily encourage the bill payer to reply using more cost effective and efficient bill payment methods preferred by the billing party, such as telephone bill paying or electronic bill payment methods, which are described in more detail below.

Attempts have been made to improve the efficiency of account payment methods. One such method involves payment of bills though electronic bill payment systems, such as PayPal, CheckFree, C2it by Citibank, Visa ePay, Quicken, MS Money, etc., that are directly operated by the billing party or an independent third party payment service provider. For example, bill delivery and payment is transacted over a communication network such as the well-known internet network or the world wide web thereof. The bill payer typically uses a personal computer to access or login in on a web site provided by a server computer to view bill information and instruct the server computer to make bill payments accordingly. Optionally, without visiting a web site, a bill payer may be provided with electronic bills in the form of electronic mail (e-mail) at his/her e-mail address. After opening an electronic bill by accessing or logging into an e-mail site, a bill payer may make the bill payment by replying to the electronic bill or by accessing a web site to secure electronic payment.

Although such electronic means over the internet (via accessing or logging into a web site or e-mail site) for account payment takes advantage of the advanced personal computer and internet communication technologies, such electronic means often is not a viable option to bill payers who may have limited or no access to the internet to carry out such electronic banking services. For example, business or leisure travelers who are often on the road or employees at off-site work locations typically have limited or no access to the internet or e-mail sites to receive any bill payment notification or transmit any bill payments. Moreover, internet or e-mail account payment services often fail to provide instantaneous, real-time notification to a bill payer and are not always conveniently accessible at all locations (e.g., when driving or taking public transportation, no household/work internet access, etc.).

Other alternatives that have been proposed are pre-authorizations from a bill payer to a billing party or third party payment service that automatically deduct a bill payment from a bill payer account each month (i.e., recurring electronic funds transfer (REFT) from a checking or savings account or having a credit card charged automatically). This type of account payment method suffers from a lack of bill payer control as the bill payer no longer has the choice of not to pay the bill. For example, if the bill payer wants to dispute a charge on the bill, it is often very difficult to, short of closing the account, to prevent the billing party from taking a disputed amount from the bill payer's account due to the pre-authorization. Moreover, typically such pre-authorizations require that the bill payer use a specific funding account, in turn making it difficult for the bill payer to change the funding account at the time of payment as bill payment is automatically processed without input from the bill payer. It has further been suggested to use telephone systems, such as TelPay, for handling bill payments. Such systems typically incorporate voice response technology that allows a bill payer to make a one-time electronic funds transfer (EFT) payment from a checking or savings or a one-time credit card payment. However, to date, such systems are limited in that they rely on the bill payer to initiate the bill-paying process by calling the telephone bill paying system first after receiving a bill, typically in the mail, and providing the telephone system with information on the bills to be paid.

Accordingly, there is a need in the art for alternate methods and systems that facilitate efficient account payment whereby a bill payer may conveniently and reliably receive bill delivery from any location and optionally, at the same time or a later time, effectively make the bill payment by taking full advantage of advanced wireless communication technologies. Such an improved account payment system may further leverage existing systems, such as an existing telephone bill paying system. These and other shortcomings in the prior art are addressed in the present invention.

BRIEF SUMMARY OF THE INVENTION

Embodiments of the present invention provide methods and systems for providing notification to a wireless communication device user regarding an account payment. One method comprises dialing a phone number of a wireless communication device. A communication relating to an account payment that includes a balance due is then transmitted or delivered to a wireless communication device user. Optionally, at the same time or a later time, input from the wireless communication device user may be received regarding payment of the balance due. Such embodiments take full advantage of wireless communication technologies, such as cell phones, personal digital assistance devices (PDA's), or other wireless communications devices that are configured to have a phone number and to receive verbal communication or text messaging, to provide instantaneous, real-time, live billing notification.

Embodiments of the present invention advantageously dial a wireless communication device, preferably a cell phone, to allow for account payment delivery and optionally payment processing. A wide base of bill payers are reached as a relatively large number of bill payers often carry a cell phone on their possession at all times and locations due to its small size, low cost, and convenience/safety factors. As such, a bill payer may conveniently and reliably receive bill delivery from any location and/or at any time. Bill delivery by dialing a cell phone number and transmitting account payment information to a user over a cell phone network may further prevent against a bill being misplaced, lost, or never received. Cell phone account payment is especially of benefit to individuals who are frequent business or leisure travelers or employees at off-site work locations who may have limited or no access to internet banking services, such as internet or e-mail sites, or are not at home for conventional mail delivery. Such wireless communication bill delivery may further prevent against bills becoming past due as well as the incurrence of any finance charges and/or service terminations that often accompany past due bills. From the perspective of a provider, billing over a wireless communication network greatly reduces the high cost associated with preparing and mailing paper account statements. A provider may also build upon an existing telephone bill paying system (that relies on a user to initiate the telephone bill-paying process) so that it is reconfigured to dial and transmit account payment communications to a wireless communication device user.

Embodiments of the present invention allow for account payment of a variety of bills, including utility bills (e.g., cell phone, telephone, water, electricity, gas, garbage, cable), credit card bills, loan payment bills (e.g., home mortgage payments, car loan payments, student loan payments, commercial business loan payments), insurance payments, tax bill payments (e.g., property tax, personal income tax, business tax), merchant bills, bank bills, etc. The account balance being transmitted is generally not past due. Typically, account payment delivery and optionally payment processing is carried out by a provider. The provider may be an independent third party payment service provider, which in certain embodiments is an entity affiliated with a plurality of offices, such as Western Union. Optionally, the provider may be a direct billing party. For example, the billing party may preferably be a wireless communication device provider, such as Sprint, AT&T, Verizon Wireless, T-Mobile, etc., that may easily transmit a cell phone bill to its cell phone customer each month over its cellular phone network. This is because the wireless communication device provider is already in a position to have a pre-existing account record for the user including an account number, balance due, balance due date, etc. as well as the associated cell phone number.

The methods of the present invention may preferably be carried out by a host computer system which has a record of when the account payment is due and dials and transmits within a predetermined time frame. For example, if an account payment is due August 31, a predetermined time frame in a range from about 31 days to 1 day prior to the due date, in this instance from July 31 to August 30, may trigger the host computer to dial and transmit bill notification. The host computer will further incorporate a communications systems, such as an interactive voice response unit (IVR system) that may transmit a verbal communication to the wireless communication device user or a text messaging system that may transmit a text message to the wireless communication device user. Generally, such methods will further comprise pre-registering or enrolling the wireless communication device user. For instance, pre-registering may comprise receiving and storing information from the wireless communication device user or a billing party regarding at least one bill payment account. Such information as the billing party's name, address, phone number, and/or bank, the user's account number, the balance due, the balance due date, etc. will be received and stored on the host computer. Additional information such as pre-registered payment options may also be received and stored on the host computer. A personal identification number (PIN) or user identifier associated with the wireless communication device user will also be created. This identifier may simply comprise the wireless communication device phone number as this identifier may be easily rememberable and memorizable by a wireless device user. Hence, the host computer may keep track of account payments for a variety of bills as well as any payment option is associated with each account and dial and transmit such billing notices depending on when account payments become due. The host computer may further facilitate payment of the balance due in a variety of fashions which encourage a bill payer to submit remittances using more cost effective and time efficient bill payment systems for both the bill payer (i.e., reduce postage costs) and the provider (i.e., reduce payment processing time and costs).

The methods of the present invention may be embodied in a computer-readable storage medium having a computer-readable program embodied therein for directing operation of a computer system. Such a computer system may include a communications system, a processor, and a storage device. The computer-readable program includes instructions operating the computer system to notify a wireless communication device user regarding an account payment in accordance with the embodiments described above.

Embodiments of the present invention further provide methods for receiving account payment notification on a wireless communication device. One method comprises answering a phone call on a wireless communication device. A communication relating to an account payment that includes a balance due is received from a provider. Payment information is then transmitted in accordance with the balance due to the provider. Answering the phone call may comprise a live verbal response from the wireless communication device user in the case of a picked up phone call or a voice mail of the wireless communication device user in the case of a missed phone call.

Embodiments of the present invention further include account payment notification systems. Such a system may include a host computer and a database associated with the host computer. The database maintains records for pre-registered information on a wireless communication device user including a user identifier, an account payment, and the when the account payment is due. The host computer is configured to dial a phone number of a wireless communication device user and transmit a communication relating to the account payment that includes a balance within a pre-determined time period.

These and other embodiments of the present invention are described in more detail in conjunction with the text below and attached figures.

BRIEF DESCRIPTION OF THE DRAWINGS

A further understanding of the nature and advantages of the present invention may be realized by reference to the detailed description and claims when considered in connection with the drawings, wherein like reference numerals are used throughout the several drawings to refer to similar components.

DETAILED DESCRIPTION OF THE INVENTION

Embodiments of the present invention provide methods and systems for account payments. In particular, the present invention provides methods and systems that allow a provider to deliver account payment information to a wireless communication device user. Such methods and systems advantageously allow for notification of account payment and optionally payment in a time efficient and cost effective manner to both the device user/bill payer and the provider/billing party. Moreover, such methods take full advantage of the wireless communication technologies, such as cell phones and PDA's, to provide instant billing notification to a wide base of wireless device users who may conveniently receive such bill delivery and optionally transmit a payment at virtually any location and/or any time.

Figure 1:
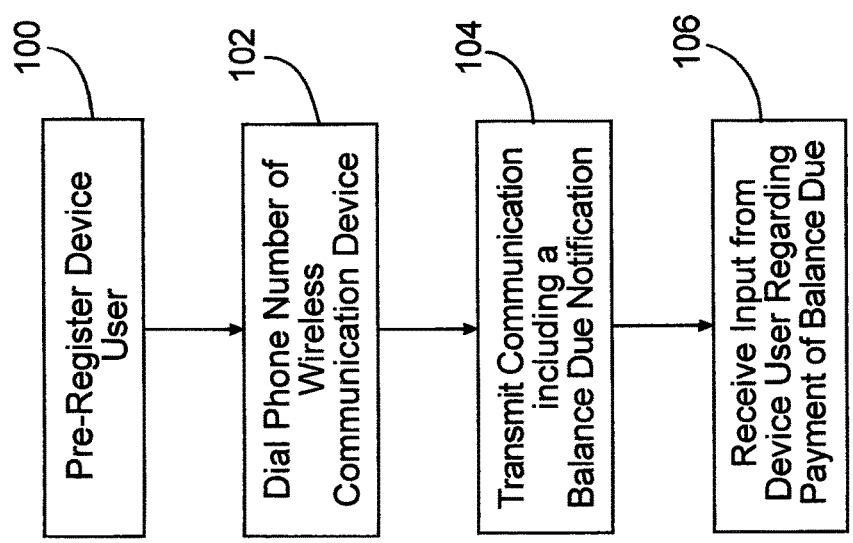
FIG. 1 provides a flow diagram illustrating one method for providing account payment notification to a wireless communication device user.

The flow diagram of FIG. 1 illustrates one method of providing account payment notification to a wireless communication device user according to the present invention. At block 100, the provider pre-registers or enrolls a wireless communication device user. The provider may be an independent third party payment service provider, which in certain embodiments is an entity affiliated with a plurality of offices so any in-person visits to one of the provider's offices by the device user in many geographical locations are convenient. Optionally, the provider may be a direct billing party. For example, the billing party may preferably be a cell phone provider that may easily enroll or pre-register a cell phone user at the same time the cell phone user signs up for cell phone service. This way the cell phone company may easily transmit a cell phone bill to its cell phone customer each month over its cell phone network. Alternatively, the billing party may comprise a utility company that transmits a utility bill, a credit card company that transmits a credit card bill, a loan company that transmits a loan bill, an insurance company that transmits an insurance bill, a federal or state government that transmits a tax bill, etc., over the wireless communication network each month. At block 102, a phone number of the wireless communication device is dialed and at block 104 a communication relating to an account payment that includes a balance due is then transmitted or delivered to the wireless communication device user. The account balance being transmitted by the provider is generally not past due. At block 106, optionally, at the same time or a later time, input from the wireless communication device user may be received regarding payment of the balance due.

Figure 2:
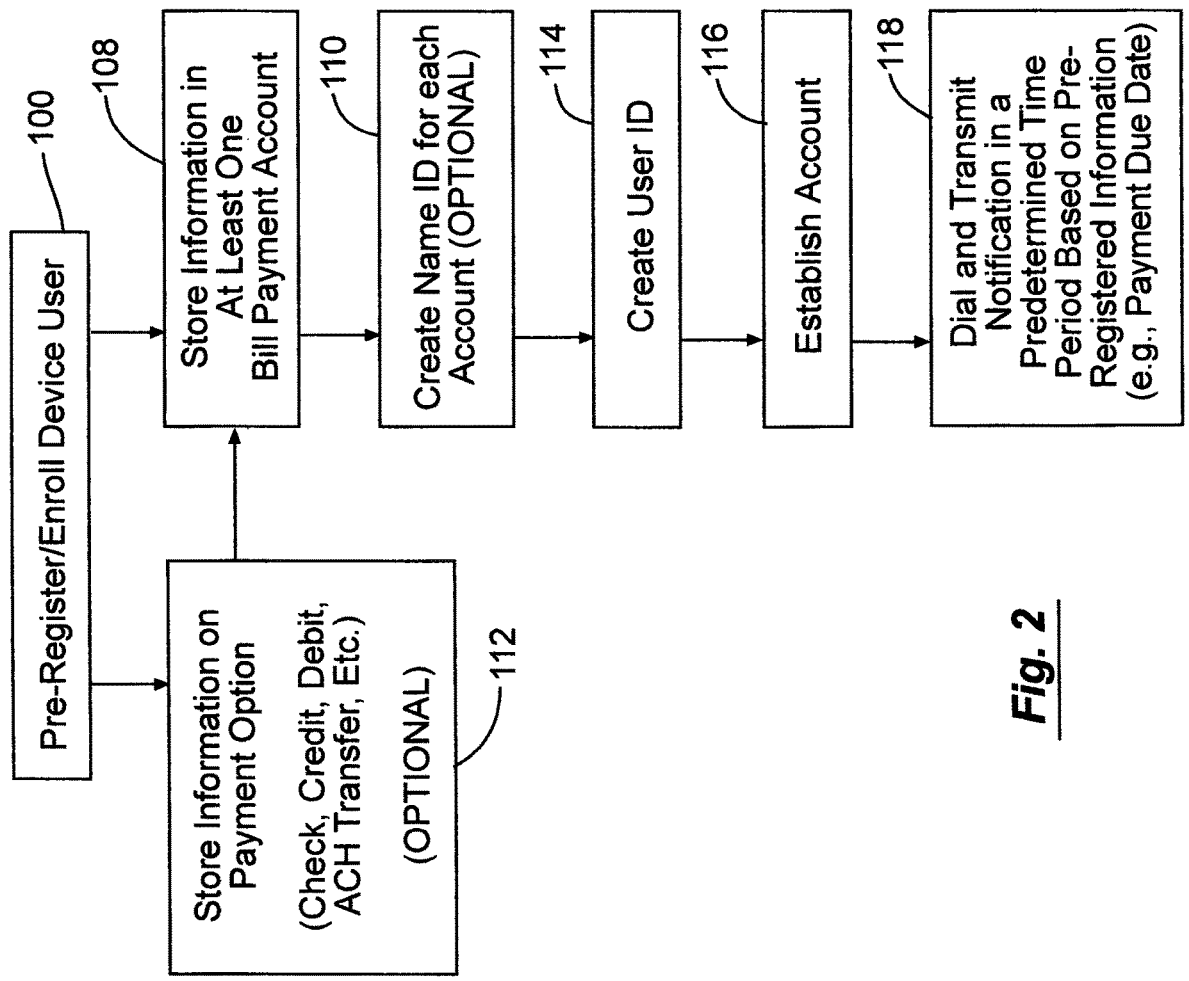
FIG. 2 provides a flow diagram illustrating one method to pre-register a wireless communication device user.

The flow diagram of FIG. 2 illustrates one method for pre-registering or enrolling 100 the wireless communication device user according to the present invention. At block 108, pre-registering comprises receiving and storing information from the wireless communication device user or a billing party regarding at least one bill payment account. Such information may include the billing party's name, address, phone number, and/or bank deposit information as well as the device user's account number and/or any PIN number(s) that may be associated with the account, the balance due, the balance due date, etc. In the case where the provider is a third party payment service provider, the provider may further verify the account payment information directly with the billing party. At block 110 (optional), in the case where multiple account payments are enrolled, a name identifier associated with each bill may be created and optionally changed by the device user so that the user may easily identify which bill is associated with each bill payment notification. Pre-registering may further comprise receiving and storing information from the wireless communication device user regarding a payment option, as indicated at block 112 (optional). The payment option may be selected from a group consisting of checks (i.e., from a checking or money market account), credit cards (i.e., VISA, Master Card, American Express, Discover, Diners Club, Carte Blanche, etc.), debit cards (i.e., banking card linked to checking, savings, certificate of deposit, or money market account, anonymous debit cards, e.g., one associated with Master Card, VISA, and the like, a stored value card, internet cash card, etc.), an Automated Clearing House (ACH) transfer from a bank account, and the like. Optionally, a particular payment option may be associated with a particular bill payment account. For example, a utility bill may be paid from a credit card funding source while a mortgage payment may be paid from a debit card source.

At block 114, a PIN or user identifier associated with the wireless communication device user will also be created to identify a particular bill payer with a particular set of accounts. This identifier may simply comprise the wireless communication device phone number as this identifier may be easily recallable. However, for security reasons this identifier may be some other unique code that may be changed by the device user. At block 116, an account record is established and at block 118 a phone number of the wireless communication device is dialed and the notification transmitted within a predetermined time frame based on the account record of pre-registered information. For example, a predetermined time frame may be in a range from about 31 days to 1 day prior to the balance due date. It will further be appreciated that any pre-registered information with respect to each bill payment account and/or payment option may be easily altered or changed at any time. For example, new bill payment accounts may be added, old bill payment accounts may be deleted, or payment option funding accounts may be added or modified.

Figure 3A:
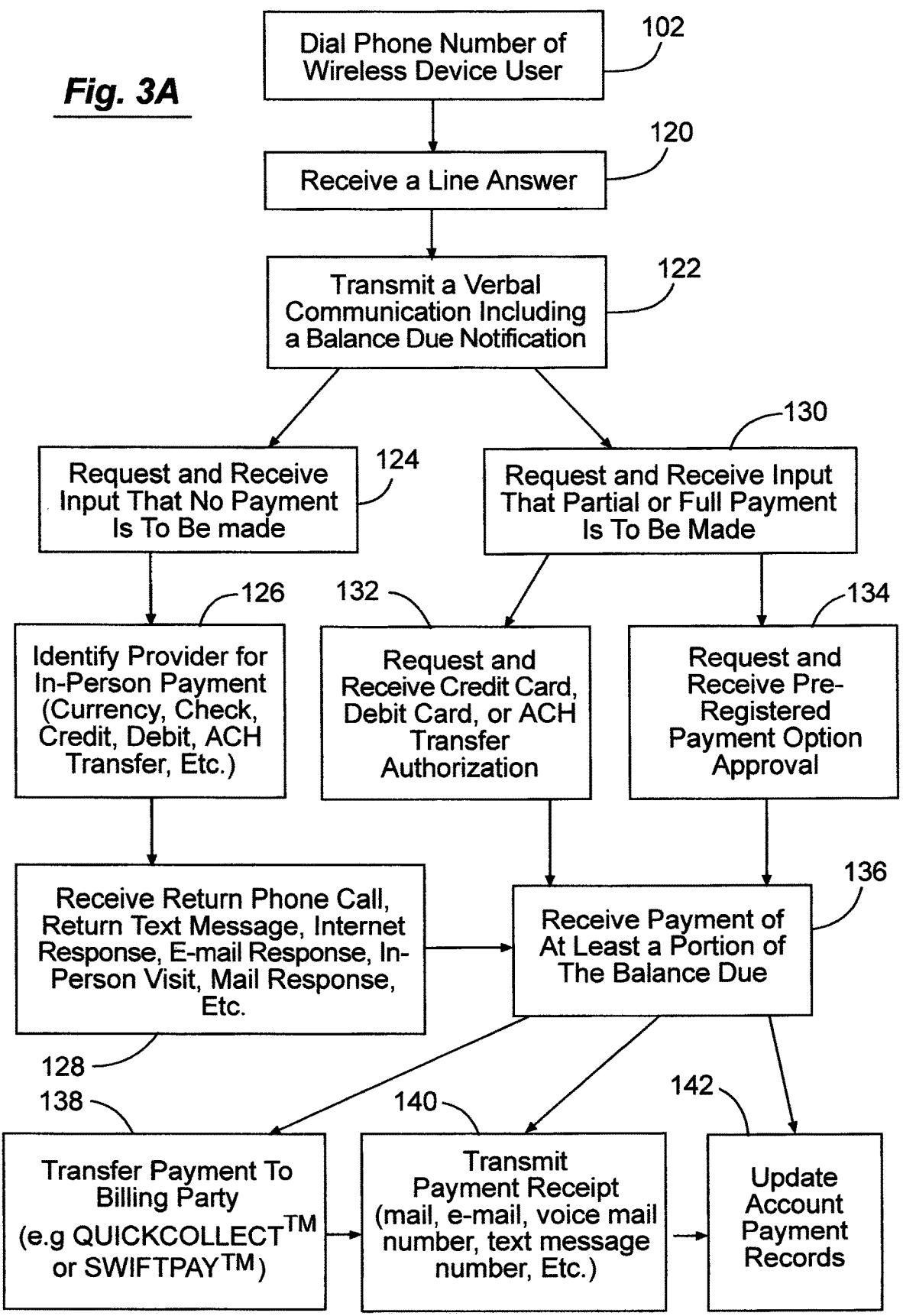
FIG. 3A provides a flow diagram illustrating a variety of methods for providing account payment notification in response to a live verbal answer.

The flow diagram of FIG. 3A illustrates a variety of methods for providing account payment notification in the instance of a picked up phone call. At block 102, a phone number of the wireless communication device is dialed. At block 120, the phone call is answered in the form of a live verbal answer from the wireless communication device user. Once an answer is received from the wireless communication device in the form of the live verbal response, a verbal communication is transmitted relating to an account payment that includes a balance due, as shown at block 122. Typically, verbal communication may be transmitted by an IVR system or by a customer service representative of the provider. Transmitting further comprises requesting whether no, partial, or full payment of the balance due is to be made.

At block 124, input is received from the communication device user that no payment is to be made at this time. If no payment is to be currently made with bill notification, transmitting further comprises identifying a provider location where payment may be made in-person, as indicated at block 126. Hence, in certain embodiments it is advantageous to have a provider as an entity affiliated with a plurality of offices so any in-person visits to one of the provider's offices by the device user in many geographical locations are convenient. In-person payments may be made in the form of currency (i.e., cash), checks (i.e., from a checking or money market account), credit cards (i.e., VISA, Master Card, American Express, Discover, Diners Club, Carte Blanche, etc.), debit cards (i.e., banking card linked to checking, savings, certificate of deposit, or money market account, anonymous debit cards, e.g., one associated with Master Card, VISA, and the like, a stored value card, internet cash card, etc.), an ACH transfer from a bank account, and the like. At block 128, input from the wireless device user regarding payment of the balance due may further comprise receiving a return phone call (wireless or land line) to a customer service representative or an IVR system, a return text message, an internet response, e-mail response an in-person visit, or a mail response that includes payment of at least a portion of the balance due 136. The payment may be tendered in any of the forms described above, including currency, check, credit card, debit card, and ACH transfer. In certain circumstances, the phone number of the wireless communication device may be re-dialed to transmit a second and/or final notification regarding payment of the balance due if no payment from the wireless device user is received within a certain predetermined period of time.

At block 130, input from the device user is preferably received that partial or full payment of the balance due is to be made. Transmitting then further comprises requesting a new credit card or debit card authorization or a pre-registered payment option approval, as illustrated in FIG. 2, from the wireless communication device user for a partial or full payment of the balance due. Such a payment query is advantageous as it allows the device user with enhanced options for bill payment. For instance, if a device user is pre-registered for a specific funding account (optional) and later, at time of bill payment, wanted to pay the bill using an alternate funding account, the device user may easily change the funding account at the time of bill payment by inputting the new credit card or debit card authorization 132 for partial or full payment of the balance due. It will further be appreciated that block 132 may further provide other alternatives for payment tender, such as an ACH transfer from a bank account. At block 134, input from the wireless device user regarding payment of the balance due may alternatively comprise receiving a pre-registered payment option approval for partial or full payment of the balance due. Further options may be provided at the time of payment, such as receiving and processing a request from the device user to post date the payment or to even cancel the payment within a predetermined time of payment authorization. As indicated at block 136, a one-time payment of at least a portion of the balance due is received by the provider in response to the received input from the wireless device user 128, 132, 134.

In the instance where the provider is an independent third party payment service provider (e.g., Western Union), payment of at least a portion of the balance due to a billing party may be transferred, as indicated at block 138, after payment receipt to the provider 136. Payment to the billing party may be preferably electronically transferred over a computer implemented transfer network. Optionally, payment may be made to the billing party utilizing some other negotiable instrument, such as issuing a check and mailing it through the postal service. Examples of other payment transfer systems that may be employed with the present invention are QUICK COLLECT™ or SWIFTPAY™ transfer services available from Western Union and described respectively in co-pending U.S. patent application Ser. No. 10/112,440, entitled Systems and Methods for Enrolling Consumers in Goods and Services, filed Mar. 29, 2002, and Ser. No. 10/112,258, entitled Electronic Identifier Payment Systems and Methods, filed Mar. 29, 2002, the complete disclosures of which are incorporated herein by reference.

At block 140, the provider may further transmit a payment receipt to the wireless communication device user upon receipt of the payment 136 or after payment transfer 138. The payment receipt may be transmitted to the wireless communication device user's mailing address in the case of a paper receipt, e-mail address or text message number in the case of an electronic receipt, or voice mail number in the case of a verbal receipt. After receipt transmission 140 or after payment transfer 136, the account payment records for the device user may be updated indicating account payment to the provider and/or payment to a third billing party.

Figure 3B:
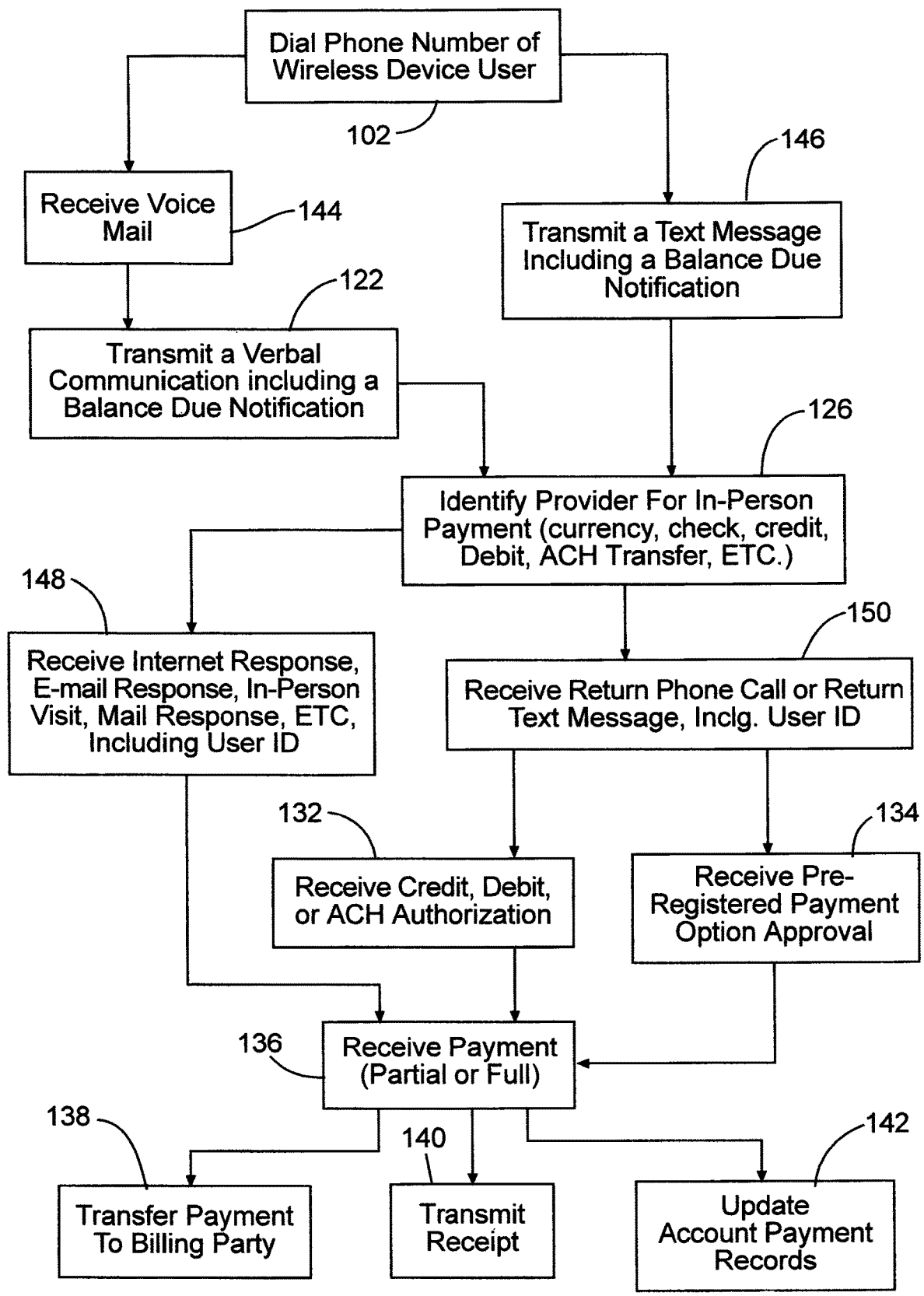
FIG. 3B provides a flow diagram illustrating a variety of methods for providing account payment notification in a text message situation or in response to a missed phone call.

The flow diagram of FIG. 3B, illustrates a variety of methods for providing account payment notification in the instance of a missed phone call. At block 102, a phone number of the wireless communication device is dialed. At block 144, the missed phone call is answered in the form of a voice mail of the wireless communication device user. Once an answer is received from the wireless communication device in the form of the voice mail 144, a verbal communication is transmitted relating to an account payment that includes a balance due, as indicated at block 122. Typically, verbal communication may be transmitted by an IVR system or by a customer service representative of the provider. The flow diagram of FIG. 3B also illustrates a variety of methods for providing account payment notification in a text message situation. At block 102, a phone number of the wireless communication device is dialed. At block 146, instead of a verbal communication 122, a text message communication is transmitted to the wireless communication device relating to the account payment and balance due. Typically, text message communication may be transmitted from a text messaging system of the provider.

Upon text message transmission 146 or missed phone call transmission 144, 122, transmitting further comprises (text or verbal) identifying a provider location where payment may be made in-person, as indicated at block 126. In-person payments may be made in the form of currency, checks, debit cards, an ACH transfer from a bank account, and the like. At block 148, input from the wireless device user regarding payment of the balance due may comprise receiving an internet response, e-mail response, an in-person visit or mail response that includes the pre-registered user identification 114 to facilitate account payment and payment of at least a portion of the balance due 136. The payment may be tendered in any of the forms described above, including currency, check, credit card, debit card, and ACH transfer.

Preferably, as indicated at block 150, input from the wireless device user regarding payment of the balance due comprises a return phone call (wireless or land line) to a customer service representative or an IVR system or a return text message. The device user further furnishes the pre-registered user identification 114 to facilitate payment of the account balance. A new credit card, debit card, or ACH authorization 132 or a pre-registered payment option approval 134 is accordingly received. At block 136, payment of at least a portion of the balance due is received in response to the input from the wireless device user 148, 132, 134. Payments may then optionally be transferred to a billing party 138, payment receipts transmitted to the wireless communication device user 140, or account payment records updated 142.

Figure 4:
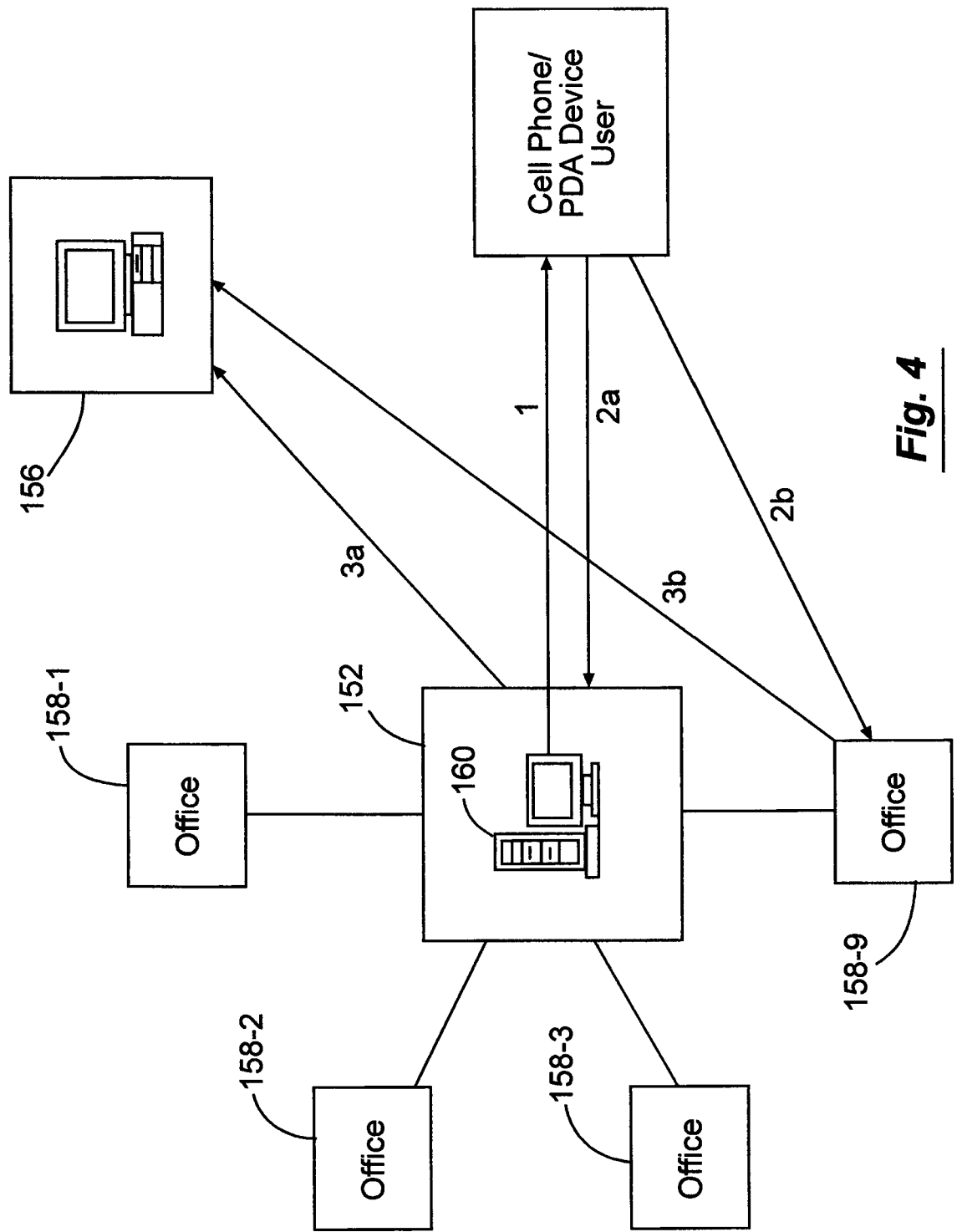
FIG. 4 provides a schematic illustration of the interconnection of various entities in different embodiments of the present invention.

FIG. 4 provides schematic diagrams illustrating communication between a provider 152, a wireless communication device user, namely a cell phone or PDA device user 154, and a billing party 156. The provider 152, in this illustration, is an independent third party payment service provider. However, it will be appreciated that the provider 152 and billing party 156 may comprise the same entity in other embodiments of the present invention. The provider 152 may comprise a central organization and a plurality of offices 158-(1-4) structure. As used herein, "office" is intended to be interpreted broadly and refers to any place affiliated with the provider and capable of interfacing with the cell phone user 154 and/or a billing party 156. The affiliation between the provider 152 and a given office 158 may take the form of a contractual, agency, joint venture, or other similar relationship, in addition to being a subsidiary or business place of the provider 152.

Bill delivery may be effected by having the cell phone user 154 answer a phone call and receive by the provider 152 a communication relating to account payment that includes a balance due, as indicated by arrow 1. The cell phone user 154 may then transmit payment information in accordance with the balance due in a variety of fashions. For instance, the cell phone user 154 may preferably authorize credit card, debit card, ACH transfer authorization or pre-registered payment option approval directly over the phone (wireless or land line) to the provider 152, as indicated by arrow 2*a*. Alternatively, the cell phone user 154 may make a payment in-person by visiting one of the provider offices 158-4, as indicated by arrow 2*b*. Still further the cell phone user 154 may transmit payment in a return phone call response, return text message response, internet response, e-mail response, in-person visit response, or mail response to the provider 152 or one of its affiliated offices 158. After receipt of the payment, the provider 152 or office 158-4 may further transfer payment of at least a portion of the balance due to a billing party 156, as indicated respectively by arrows 3*a* and 3*b*, by the internet or other negotiable instrument.

Bill delivery notification may preferably be carried out by a host computer system 160 of the provider 152 which has a record of when the account payment is due based on pre-registered information and dials and transmits account payment notification within a predetermined time frame. The pre-registered information (i.e., user identifier, account name, balance, due date, etc.) on the wireless device communication user is typically received and stored on a computer database. The host computer system may further receive and process input from the wireless communication device user regarding payment of the balance due. The host computer system may further receive a payment of at least a portion of the balance due in response to the received input from the wireless device user as well optionally transfer the payment to a billing party. The host computer system may further transmit a payment receipt to the device user and update the account payment records.

Figure 5:
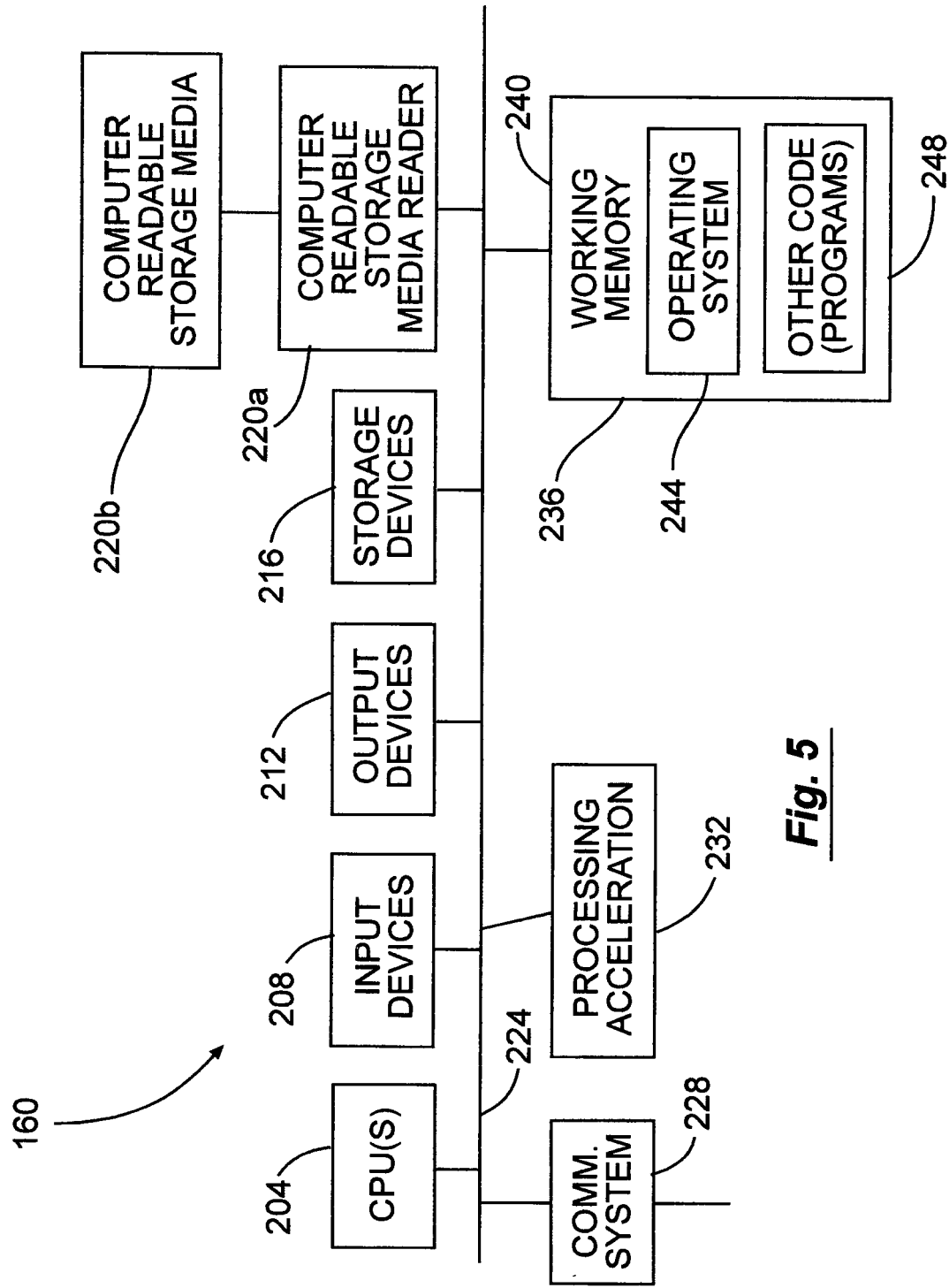
FIG. 5 provides a schematic illustration of a configuration of a computer system on which methods of the present invention may be embodied.

An example of a configuration that may be used for the host provider computer 160 is shown in FIG. 5. FIG. 5 broadly illustrates how individual system elements may be implemented in a separated or more integrated manner. The provider computer 160 is shown comprised of hardware elements that are electrically coupled via bus 224, including a processor 204, an input device 208, an output 212, a storage device 216, a computer-readable storage media reader 220*a*, a communications system 228, a processing acceleration unit 232 such as a DSP or special-purpose processor, and a memory 236. The computer-readable storage media reader 220*a* is further connected to a computer-readable storage medium 220*b*, the combination comprehensively representing remote, local, fixed, and/or removable storage devices plus storage media for temporarily and/or more permanently containing computer-readable information. For the illustrated embodiment, the communications system 228 incorporates an IVR system that may transmit and receive verbal communication or a text messaging system that may transmit and receive text messages.

The provider computer 160 also comprises software elements, shown as being currently located within working memory 240, including an operating system 244 and other code 248, such as a program designed to implement the methods and systems of the present invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

Although certain preferred embodiments and methods have been disclosed herein, it will be apparent from the foregoing disclosure to those skilled in the art that variations, modifications, alternative constructions, and equivalents of such embodiments and methods may be made without departing from the true spirit and scope of the invention. Therefore, the above description should not be taken as limiting the scope of the invention which is defined by the appended claims.

What is claimed is:

1. A method for notifying a wireless communication device user regarding an account payment, the method comprising:

receiving, electronically by a communications system of a host computer system, account payment registration information to permit the device user to receive automatic payment notification from the host computer relating to a recurring debt that requires payment, wherein:
  the host computer system comprises a processor, a storage device, at least one input device, and at least one output device;
  the communications system comprises a text messaging system configured to transmit and receive text messages;
  the account payment registration information comprises a phone number of a wireless communication device where notices of the recurring debt are to be sent, an account identifier that is associated with an account having a balance due; and
  the recurring debt comprises the balance due, a due date for when the payment is due, and a payment source that is-to be debited an amount of a payment toward the balance due;
creating, by the host computer, a user identifier associated with the wireless communication device user;
establishing, at the host computer system, a trigger for sending a notice to the user that the payment is coming due, wherein the trigger is based on a certain specified time frame prior to the due date;
triggering, by the host computer system, the trigger when the specified time frame is reached;
following activation of the trigger that indicates that the due date is within the specified time frame, establishing, by the communications system of the host computer system, a connection with the wireless communication device using the phone number of the wireless communication device;
wirelessly transmitting, by the text messaging system of the host computer system directly over a wireless network to the wireless communication device, a text-based communication that produces a textual message on a display of the wireless communication device, the text-based communication specifying the balance due for the account that is associated with the account identifier and querying whether the user wishes to pay the balance due using the payment source, wherein the text-based communication further comprises (1) a query related to whether no payment of the balance due is to be made, whether partial payment of the balance due is to be made, and whether full payment of the balance due is to be made (2) an identification of a provider location where payment may be made in-person, and (3) a request for authorization of a new payment source;
altering the user identifier based on a change made by the wireless communication device;
receiving, at the text messaging system of the host computer system, an input from the wireless communication device regarding payment of at least a portion of the balance due using the new payment source;
receiving, using the communications system, a payment of at least the portion of the balance due using the new payment source;
generating a text-based payment receipt upon receipt of the payment; and
electronically transmitting, by the text messaging system of the host computer system, the text-based payment receipt over the wireless network to the wireless communication device using the phone number of the wireless communication device as an destination address, wherein the text-based payment receipt causes the text-based payment receipt to display on the wireless communication device.

2. A method as in claim 1, further comprising receiving an answer from the wireless communication device prior to transmitting the communication.

3. A method as in claim 2, wherein the answer comprises a live verbal response from the wireless communication device user or a voice mail of the wireless communication device user.

4. A method as in claim 1, wherein transmitting further comprises requesting a new credit card, debit card, or ACH transfer authorization or a pre-registered payment option approval from the wireless communication device user for a partial or full payment of the balance due.

5. A method as in claim 1, wherein payment made in-person may be in the form of currency, check, credit card, debit card, or ACH transfer from a bank account.

6. A method as in claim 5, wherein the provider is a third party payment service provider affiliated with a plurality of offices.

7. A method as in claim 5, wherein the provider is a wireless communication device provider.

8. A method as in claim 5, wherein the provider is a billing party.

9. A method as in claim 1, wherein receiving input further comprises receiving a new credit card, debit card, or ACH transfer authorization or a pre-registered payment option approval from the wireless communication device user for a partial or full payment of the balance due.

10. A method as in claim 1, wherein receiving input further comprises receiving a return phone call to a customer service representative or an IVR system, a return text message, an internet response, an e-mail response, an in-person visit from the wireless device user, or a mail response.

11. A method as in claim 1, further comprising receiving the payment of at least a portion of the balance due in response to the received input from the wireless device user.

12. A method as in claim 11, further comprising transferring the payment of at least a portion of the balance due to a billing party.

13. A method as in claim 11, further comprising updating account payment records.

14. A method as in claim 1, wherein in the wireless communication device comprises a cell phone, a personal digital assistant device, or a wireless communication device that receives verbal communication or text messaging.

15. A method as in claim 1, further comprising pre-registering the wireless communication device user.

16. A method as in claim 15, wherein pre-registering comprises receiving and storing information from the wireless communication device user or a billing party regarding at least one bill payment account.

17. A method as in claim 16, further comprising creating a name identifier associated with each bill payment account.

18. A method as in claim 15, wherein pre-registering comprises receiving and storing information from the wireless communication device user regarding a payment option.

19. A method as in claim 18, wherein the payment option is selected from a group consisting of checks, credit cards, debit cards, or ACH transfer from a bank account.

20. A method as in claim 1, wherein the user identifier is the wireless communication device phone number.

21. A method as in claim 1, wherein transmitting is carried out by the host computer system which has a record of when the account payment is due and dials and transmits within a predetermined time frame.

22. A method as in claim 1, wherein the account balance is not past due.

23. A method for notifying a wireless communication device user regarding an account payment, the method comprising:
  receiving, electronically by a communications system of a host computer system, account payment registration information to permit the device user to receive automatic payment notification from the host computer relating to a recurring debt that requires payment, wherein:
    the host computer system comprises a processor, a storage device, at least one input device, and at least one output device;
    the communications system comprises a text messaging system configured to transmit and receive text messages;
    the account payment registration information comprises a phone number of a wireless communication device where notices of the recurring debt are to be sent, an account identifier that is associated with an account having a balance due; and
    the recurring debt comprises the balance due, a due date for when the payment is due, and a payment source that is to be debited an amount of a payment toward the balance due;
  receiving and storing, electronically using the communications system and the storage device of the host computer system, information from the wireless communication device user or a billing party regarding at least one bill payment account;
  creating, by the host computer system, a name identifier associated with each bill payment account;
  receiving, at the communications system of the host computer system, a text-based input from the wireless communication device to change the name identifier;
  creating, by the host computer, a user identifier associated with the wireless communication device user;
  establishing, at the host computer system, a trigger for sending a notice to the user that the payment is coming due, wherein the trigger is based on a certain specified time frame prior to the due date;
  triggering, by the host computer system, the trigger when the specified time frame is reached;
  following activation of the trigger that indicates that the due date is within the specified time frame, establishing, by the communications system of the host computer system, a connection with the wireless communication device using the phone number of the wireless communication device;
  wirelessly transmitting, by the text messaging system of the host computer system directly over a wireless network to the wireless communication device a communication specifying the balance due for the account that is associated with the account identifier and querying whether the user wishes to pay the balance due using the payment source and including a request for authorization of a new payment source;
  altering the user identifier based on a change made by the wireless communication device;
  receiving, electronically at the text messaging system of the host computer system, an input from the wireless communication device regarding payment of at least a portion of the balance due using the new payment source;
  receiving, using the communications system, a payment of at least the portion of the balance due using the new payment source;
  generating a text-based payment receipt upon receipt of the payment; and
  electronically transmitting, by the text messaging system of the host system, the text-based payment receipt over the wireless network to the wireless communication device user's e-mail address or text message number, wherein the text-based payment receipt causes the text-based payment receipt to display on the wireless communication device.

24. A method for notifying a wireless communication device user regarding an account payment, the method comprising:
  receiving, electronically by a communications system of a host computer system, account payment registration information to permit the device user to receive automatic payment notification from the host computer relating to a recurring debt that requires payment, wherein:
    the host computer system comprises a processor, a storage device, at least one input device, and at least one output device;
    the communications system comprises a text messaging system configured to transmit and receive text messages;
    the account payment registration information comprises a phone number of a wireless communication device where notices of the recurring debt are to be sent, an account identifier that is associated with an account having a balance due; and
    the recurring debt comprises the balance due, a due date for when the payment is due, and a payment source that is to be debited an amount of a payment toward the balance due;
  associating, by the host computer system, the payment source with the account having the balance due;
  creating, by the host computer system, a name identifier associated with each bill payment account;
  receiving, at the text messaging system of the host computer system, a text-based input from the wireless communication device to change the name identifier;
  creating, by the host computer, a user identifier associated with the wireless communication device user;
  establishing, at the host computer system, a trigger for sending a notice to the user that the payment is coming due, wherein the trigger is based on a certain specified time frame prior to the due date;
  triggering, by the host computer system, the trigger when the specified time frame is reached;
  following activation of the trigger that indicates that the due date is within the specified time frame, establishing, by communications system of the host computer system, a connection with the wireless communication device using the phone number of the wireless communication device;
  wirelessly transmitting, by the text messaging system of the host computer system directly over a wireless network to the wireless communication device a text-based communication that produces a textual message on a display of the wireless communication device, the text-based communication specifying the balance due for the account that is associated with the account identifier and querying whether the user wishes to pay the balance due using the payment source, wherein the text-based communication further comprises (1) a query related to whether no payment of the balance due is to be made, whether partial payment of the balance due is to be made, and whether full payment of the balance due is to be made, (2) an identification of a provider location where payment may be made in-person, and (3) a request for authorization of a new payment source;

altering the user identifier based on a change made by the wireless communication device;

receiving, electronically at the text messaging system of the host computer system, an input from the wireless communication device regarding payment of at least a portion of the balance due using the new payment source, wherein receiving input further comprises receiving a return phone call to a customer service representative or an IVR system;

receiving, using the communications system, a payment of at least the portion of the balance due using the new payment source;

generating a text-based payment receipt upon receipt of the payment; and electronically transmitting, by the text messaging system of the host computer system, the text-based payment receipt over the wireless network to the wireless communication device using the phone number of the wireless communication device as an destination address, wherein the text-based payment receipt causes the text-based payment receipt to display on the wireless communication device.

* * * * *